(12) United States Patent
Kim

(10) Patent No.: US 11,981,343 B2
(45) Date of Patent: May 14, 2024

(54) AUTONOMOUS VEHICLE, CONTROL SYSTEM FOR REMOTELY CONTROLLING THE SAME, AND METHOD THEREOF

(71) Applicants: Hyundai Motor Company, Seoul (KR); Kia Corporation, Seoul (KR)

(72) Inventor: Dong Hyuk Kim, Hanam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 175 days.

(21) Appl. No.: 17/545,935

(22) Filed: Dec. 8, 2021

(65) Prior Publication Data
US 2023/0001942 A1    Jan. 5, 2023

(30) Foreign Application Priority Data
Jun. 30, 2021    (KR) .......................... 10-2021-0086050

(51) Int. Cl.
*B60W 50/14*    (2020.01)
*B60W 60/00*    (2020.01)
*G01C 21/36*    (2006.01)

(52) U.S. Cl.
CPC .......... *B60W 50/14* (2013.01); *B60W 60/001* (2020.02); *G01C 21/3647* (2013.01); *B60W 2050/146* (2013.01); *B60W 2556/45* (2020.02)

(58) Field of Classification Search
CPC ............... B60W 50/14; B60W 60/001; B60W 2050/146; B60W 2556/45; G01C 21/3647
See application file for complete search history.

(56) References Cited

U.S. PATENT DOCUMENTS

| | | | | |
|---|---|---|---|---|
| 10,922,903 | B2* | 2/2021 | Dolgov | G05D 1/0044 |
| 2017/0192423 | A1* | 7/2017 | Rust | G05D 1/0238 |
| 2018/0004204 | A1* | 1/2018 | Rider | B60K 35/00 |
| 2018/0241970 | A1* | 8/2018 | Nakai | G08G 1/166 |
| 2019/0095729 | A1* | 3/2019 | Dai | G06T 11/001 |
| 2019/0220010 | A1* | 7/2019 | Leonard | B60W 50/14 |
| 2019/0294895 | A1* | 9/2019 | Kleen | G02B 27/01 |
| 2019/0389482 | A1* | 12/2019 | Michalakis | G05D 1/0055 |
| 2020/0033853 | A1 | 1/2020 | Araújo et al. | |
| 2020/0180656 | A1* | 6/2020 | Kim | G06V 20/56 |
| 2020/0201319 | A1* | 6/2020 | Gross | H04W 4/44 |
| 2020/0247412 | A1* | 8/2020 | Wang | B60W 50/14 |
| 2020/0361482 | A1* | 11/2020 | Choi | B60W 50/14 |
| 2021/0016793 | A1* | 1/2021 | Yamaguchi | G08G 1/0962 |

(Continued)

*Primary Examiner* — Hunter B Lonsberry
*Assistant Examiner* — Harrison Heflin
(74) *Attorney, Agent, or Firm* — MORGAN, LEWIS & BOCKIUS LLP

(57) ABSTRACT

An autonomous vehicle may include a display device configured to display a driving path of the autonomous vehicle; and an autonomous driving control apparatus including a processor that displays a situation in which driving of the driving path is impossible on the display device in augmented reality when the situation in which the driving of the driving path is impossible occurs due to an external environment during autonomous driving of the autonomous vehicle, transmits information related to a misrecognized obstacle to a control system when receiving a request for deleting the misrecognized obstacle, and receives a driving path in which the misrecognized obstacle is deleted from the control system and controls and follows the received driving path.

18 Claims, 13 Drawing Sheets

(56) References Cited

U.S. PATENT DOCUMENTS

| | | | |
|---|---|---|---|
| 2021/0055720 A1* | 2/2021 | Hayashida | G05D 1/0027 |
| 2021/0215490 A1* | 7/2021 | Mishra | G01C 21/3415 |
| 2021/0287536 A1* | 9/2021 | Siltanen | B60W 60/001 |
| 2021/0333124 A1* | 10/2021 | Heo | G08G 1/096844 |
| 2022/0100200 A1* | 3/2022 | Bybee | G05D 1/0297 |
| 2022/0128989 A1* | 4/2022 | Ghorbanian-Matloob | G06V 20/58 |
| 2022/0364874 A1* | 11/2022 | Jung | G01C 21/365 |

* cited by examiner

AUTONOMOUS VEHICLE, CONTROL SYSTEM FOR REMOTELY CONTROLLING THE SAME, AND METHOD THEREOF

CROSS-REFERENCE TO RELATED APPLICATION

The present application claims priority to Korean Patent Application No. 10-2021-0086050, filed on Jun. 30, 2021, the entire contents of which is incorporated herein for all purposes by this reference.

BACKGROUND OF THE INVENTION

Field of the Invention

The present invention relates to an autonomous vehicle, a control system for remotely controlling the same, and a method thereof, and more particularly, to a technique for correcting an error occurring in a remote control situation of an autonomous vehicle.

Description of Related Art

As an electronic technique of a vehicle develops, an interest in an autonomous vehicle that drives to a destination by recognizing a driving environment of the vehicle itself without manipulation of a driver is growing more and more.

An autonomous vehicle refers to a vehicle capable of operating by itself without manipulation of a driver or a passenger.

While driving in an autonomous driving mode, there may be a situation in which it is impossible to follow a driving path to the destination normally although there is no abnormality in a function of the vehicle. Accordingly, when a situation where it is impossible to follow a path occurs during autonomous driving of the autonomous vehicle, it is often difficult to follow the driving path, such as when the driver directly intervenes in control of the vehicle or when the driver's intervention is difficult, the vehicle stops.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an autonomous vehicle, a control system for remotely controlling the same, and a method thereof, configured for securing reliability for remote control by correcting a surrounding situation recognition error through remote control during remote control of the autonomous vehicle, improving commercialization of autonomous driving.

Furthermore, various aspects of the present invention are directed to providing an autonomous vehicle, a control system for remotely controlling the same, and a method thereof, configured for increasing user convenience by displaying a change in a remote control path such that a driver can intuitively check it when the remote control path is changed.

The technical objects of the present invention are not limited to the objects mentioned above, and other technical objects not mentioned may be clearly understood by those skilled in the art from the description of the claims.

Various aspects of the present invention are directed to providing an autonomous vehicle, including a display device configured to display a driving path of the autonomous vehicle; and an autonomous driving control apparatus including a processor that displays a situation in which driving of the driving path is impossible on the display device in augmented reality when the situation in which the driving of the driving path is impossible occurs due to an external environment during autonomous driving of the autonomous vehicle, transmits information related to a misrecognized obstacle to a control system when receiving a request for deleting the misrecognized obstacle, and receives a driving path from which the misrecognized obstacle is deleted from the control system and controls and follows the received driving path.

In various exemplary embodiments of the present invention, the autonomous vehicle may further include a sensing device configured to detect the situation in which the driving of the driving path is impossible.

In various exemplary embodiments of the present invention, the processor may display the driving path in which the misrecognized obstacle is deleted received from the control system on the display device in the augmented reality.

In various exemplary embodiments of the present invention, the processor may display an area in which the misrecognized obstacle is deleted in the driving path and controls the area to blink for a predetermined time period.

In various exemplary embodiments of the present invention, the processor may mark or block an area in which a vehicle is unable to be driven in the driving path.

In various exemplary embodiments of the present invention, the processor, when the driving path is displayed on the display device in the augmented reality, may display an area of a front target for maintaining an in-vehicle distance with a vehicle in front of the autonomous vehicle, and may distinguish and displays a line thickness or a line color indicating the area of the front target during a normal driving mode and a stop control mode of the autonomous vehicle.

In various exemplary embodiments of the present invention, the processor may display a front signal condition during the stop control mode.

In various exemplary embodiments of the present invention, the processor may display an area of the misrecognized obstacle in the driving path, and may display a line color or line thickness indicating the area of the misrecognized obstacle separately from that of the normal driving mode.

In various exemplary embodiments of the present invention, the processor may transmit information related to the misrecognized obstacle to the control system when receiving a request for deleting the misrecognized obstacle from the driver.

In various exemplary embodiments of the present invention, the processor, when receiving no request for deleting the misrecognized obstacle from the driver, may request remote control of the autonomous vehicle to the control system.

In various exemplary embodiments of the present invention, the processor when receiving a remote control path for the remote control request from the control system, may display the remote control path in the augmented reality.

In various exemplary embodiments of the present invention, the processor may display a screen for obtaining approval for the remote control path by a driver or an occupant on the display device.

In various exemplary embodiments of the present invention, the processor may follow and control the remote control path when approval for the remote control path from the driver or the occupant is completed.

In various exemplary embodiments of the present invention, the processor may transmit unapproved information and an unapproved remote control path to the control system when the approval for the remote control path is not completed.

In various exemplary embodiments of the present invention, the autonomous driving control apparatus may further include: a communication device configured to communicate with the control system; and a storage configured to store the remote control path received from the control system.

Various aspects of the present invention are directed to providing a control system including a processor configured to display a misrecognized obstacle on a driving path of an autonomous vehicle when receiving information related to the misrecognized obstacle from the autonomous vehicle, deletes the misrecognized obstacle on the driving path of the autonomous vehicle by receiving approval from an operator, and transmits a driving path of the autonomous vehicle in which the misrecognized obstacle is deleted to the autonomous vehicle.

In various exemplary embodiments of the present invention, the processor may generate a remote control path to provide the remote control path to the autonomous vehicle when receiving a request for remote control of the autonomous vehicle for avoiding the misrecognized obstacle from the autonomous vehicle.

In various exemplary embodiments of the present invention, the processor may re-generate a remote control path for avoiding the misrecognized obstacle when approval for the remote control path is not received from the autonomous vehicle.

Various aspects of the present invention are directed to providing a remote control method for an autonomous vehicle, including: displaying a situation in which driving of a driving path is impossible on a display device in augmented reality when the situation in which the driving of the driving path is impossible occurs due to an external environment during autonomous driving; receiving a request for deleting a misrecognized obstacle from a driver; transmitting information related to the misrecognized obstacle to a control system; and following and controlling a driving path in which the misrecognized obstacle is deleted by receiving the driving path from the control system.

In various exemplary embodiments of the present invention, displaying the driving path in which the misrecognized obstacle is deleted, wherein the displaying includes displaying an area in which the misrecognized obstacle is deleted, and controlling the area to blink for a predetermined time period.

According to the present technique, it is possible to secure reliability for remote control by correcting a surrounding situation recognition error through remote control during remote control of the autonomous vehicle, improving commercialization of autonomous driving.

Furthermore, according to the present technique, it is possible to increase user convenience by displaying a change in a remote control path such that a driver can intuitively check it when the remote control path is changed.

Furthermore, various effects which may be directly or indirectly identified through the present specification may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
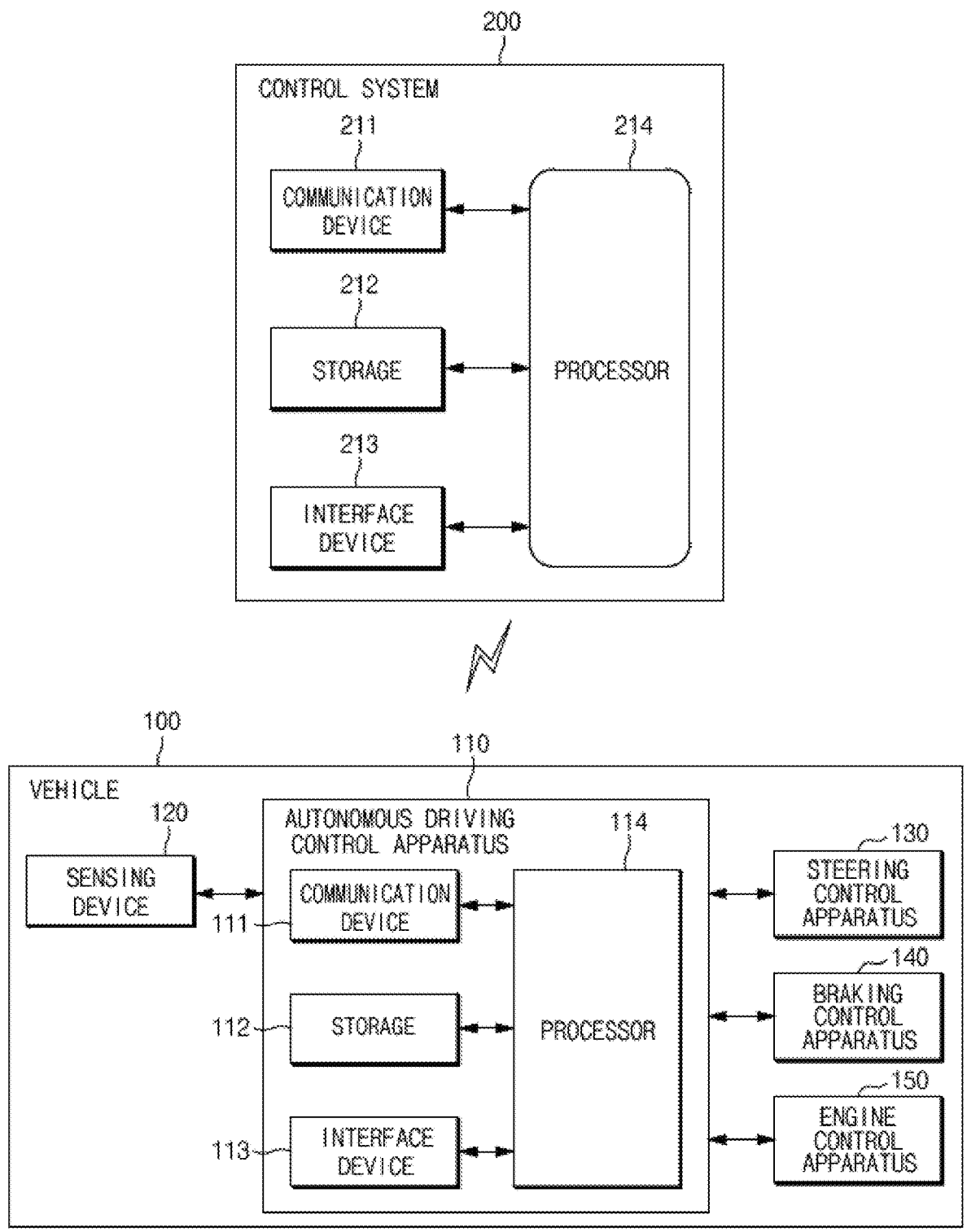
FIG. 1 illustrates a block diagram showing a configuration of a remote control system for an autonomous apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, some exemplary embodiments of the present invention will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to various exemplary embodiments of the present invention, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which various exemplary embodiments of the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present invention will be described in detail with reference to FIG. 1 to FIG. 12.

FIG. 1 illustrates a block diagram showing a configuration of a remote control system for an autonomous apparatus according to various exemplary embodiments of the present invention.

Referring to FIG. 1, the remote control system for an autonomous vehicle according to various exemplary embodiments of the present invention includes a vehicle 100 and a control system 200, and remote control may be performed through communication between the vehicle 100 and the control system 200. In the instant case, the vehicle 100 may include an autonomous vehicle.

The vehicle 100 may include an autonomous driving control apparatus 110, a sensing device 120, a steering control apparatus 130, a braking control apparatus 140, and an engine control apparatus 150.

The autonomous driving control apparatus 110 according to the exemplary embodiment of the present invention may be implemented inside the vehicle. In the instant case, the autonomous driving control apparatus 110 may be integrally formed with internal control units of the vehicle, or may be implemented as a separate device to be connected to control units of the vehicle by a separate connection means.

The autonomous driving control device 110 may request remote control to the control system 200 when a situation occurs in which driving of a driving path is impossible due to an external environment during autonomous driving.

In the instant case, when the situation in which the driving of the driving path is impossible occurs due to misrecognition of an obstacle detected by the sensing device 120, the autonomous driving control apparatus 110 may delete the misrecognized obstacle.

Furthermore, the autonomous driving control apparatus 110 may display the situation in which the driving of the driving path is impossible and the misrecognized obstacle based on augmented reality such that a driver can check it at a glance.

When receiving a request for deleting the misrecognized obstacle from the driver, the autonomous driving control apparatus 110 may transmit information related to the misrecognized obstacle to the control system 200, and may continue to perform autonomous driving by receiving the remote control path in which the misrecognized obstacle is deleted from the control system 200.

In the instant case, the autonomous driving control apparatus 110 may determine that the driver has requested the deletion of the misrecognized obstacle when the driver double-touches the misrecognized obstacle or presses and holds the misrecognized obstacle for a predetermined time period.

Furthermore, when the driver does not request the deletion of the misrecognized obstacle, the autonomous driving control apparatus 110 may request the remote control for avoidance control for the misrecognized obstacle to the control system. Accordingly, the autonomous driving control apparatus 110 may receive a remote control path for avoidance control for the misrecognized obstacle from the control system 200 to continue the autonomous driving.

Referring to FIG. 1, the autonomous driving control apparatus 110 may include a communication device 111, a storage 112, an interface device 113, and a processor 114.

The communication device 111 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, Local Interconnect Network (LIN) communication, flex-ray communication, Ethernet communication, and the like.

Furthermore, the communication device 111 may perform communication by use of a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, Worldwide Interoperability for Microwave Access (WiMAX), Ethernet communication, etc. Furthermore, short-range communication technique may include Bluetooth, ZigBee, ultra wideband (UWB), radio frequency identification (RFID), infrared data association (IrDA), and the like. For example, the communication device 111 may perform wireless communication with the control system 200, may transmit vehicle position information (e.g., vehicle coordinates), surrounding information (e.g., obstacle information), vehicle information (e.g., overall length and width of a host vehicle), a remote control request, etc. to the control system 200, and may receive a remote control path, an approval request for the remote control path, a remote control command, and the like from the control system 200.

The storage 112 may store sensing results of the sensing device 120, information received from the control system 200, data and/or algorithms required for the processor 114 to operate, and the like.

As an example, the storage 112 may store vehicle information, a vehicle driving path, front image data captured by a camera, and a remote control path received from the control system 200.

The storage 112 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 113 may include an input means for receiving a control command from a user and an output means for outputting an operation state of the autonomous driving control apparatus 110 and results thereof. Herein, the input means may include a key button, and may further include a mouse, a keyboard, a touch screen, a microphone, a joystick, a jog shuttle, a stylus pen, and the like. Furthermore, the input means may further include a soft key implemented on the display.

The output means may include a display, and may further include a voice output means such as a speaker. In the instant case, when a touch sensor formed of a touch film, a touch sheet, or a touch pad is provided on the display, the display may operate as a touch screen, and may be implemented in a form in which an input device and an output device are integrated.

In the instant case, the display may include at least one of a liquid crystal display (LCD), a thin film transistor liquid crystal display (TFT LCD), an organic light emitting diode display (OLED display), a flexible display, a field emission display (FED), or a 3D display.

As an example, the interface device 113 may be implemented as a head-up display (HUD), a cluster, an audio video navigation (AVN), a human machine interface (HM), a user setting menu (USM), or the like.

For example, the interface device 113 may display the remote control path received from the control system 200, the approval request for the remote control path, and the remote control command.

Furthermore, the interface device 113 may receive an approval input from a driver or an occupant on an approval request screen for a remote control path received from the control system 200. To the present end, the interface device 113 may receive the input from the driver through a mouse, a keyboard, a touch screen, a microphone, or the like.

The processor 114 may be electrically connected to the communication device 111, the storage 112, the interface device 113, and the like, may electrically control each component, and may be an electrical circuit that executes software commands, performing various data processing and calculations described below.

The processor 114 may process a signal transferred between components of the autonomous driving control apparatus 110, and may perform overall control such that each of the components can perform its function normally.

The processor 114 may be implemented in a form of hardware, software, or a combination of hardware and software, or may be implemented as microprocessor, and may be, e.g., an electronic control unit (ECU), a micro controller unit (MCU), or other sub controllers mounted in the vehicle.

When a situation in which driving of a driving path is impossible due to an external environment occurs during autonomous driving, the processor 114 may display the situation in which the driving of the driving path is impossible on the interface device 113 in the augmented reality. Furthermore, when receiving a request for deleting a misrecognized obstacle that causes the situation in which the driving of the driving path is impossible from the driver, the processor 114 transmit the information related to the misrecognized obstacle to the control system, and may receive the driving path in which the misrecognized obstacle is deleted from the control system 200 and follow and control the received driving path.

The processor 114 may perform a remote control request for avoidance control of the misrecognized obstacle to the control system 200 when receiving no request for deleting the misrecognized obstacle from the driver.

The processor 114 may transmit information for remote control when the remote control is requested to the control system 200. In the instant case, the information may include vehicle position information (e.g., vehicle coordinates), image information around the vehicle, information around the vehicle (e.g., obstacles, moving vehicle information, stationary vehicle information (fixed objects), map information, and the like.

The processor 114 may display the driving path in which the misrecognized obstacle received from the control system 200 is deleted on the interface device 113 in the augmented reality. That is, the processor 114 may display an area in which the misrecognized obstacle is deleted during the driving path, and may control the deleted area to blink for a predetermined time period. In the instant case, the deleted area may be displayed through box processing using a rectangle or the like, rounding processing of a circle, or the like. Furthermore, the processor 114 may mark or block an area in which vehicle driving is impossible in the driving path.

When the driving path is displayed based on augmented reality on the interface device 113, the processor 114 may box-process and display a front target for maintaining an inter-vehicle distance with a vehicle in front, and may distinguish and display a line thickness or a line color of the box of the front target during the normal driving mode and the stop control mode. Furthermore, the processor 114 may display a front signal condition (e.g., a traffic light) together during the stop control mode.

The processor 114 may display the area of the misrecognized obstacle in the driving path, and may display a line color or thickness of the area of the misrecognized obstacle by distinguishing it from that in the normal driving mode. In the instant case, the area of the misrecognized obstacle may be displayed through a frame, box processing such as a rectangle, and a rounding process such as a circle of the misrecognized obstacle.

When the misrecognized obstacle is double-touched by the driver, the processor 114 may recognize it as a deletion request, and may transmit the information related to the misrecognized obstacle to the control system.

When receiving no request for deleting the misrecognized obstacle that causes the situation in which the driving of the driving path is impossible from the driver, the processor 114 may request remote control to the control system 200.

When receiving a remote control path for the remote control request from the control system, the processor 114 may display the remote control path based on the augmented reality.

The processor 114 may display a screen for obtaining approval from a driver or an occupant for the remote control path on the interface device 113.

The processor 114 may follow and control the remote control path when the approval for the remote control path from the driver or the occupant is completed.

The processor 114 may transmit unapproved information and an unapproved remote control path to the control system 200 when the approval for the remote control path from the driver or the occupant is not completed.

The sensing device 120 may include one or more sensors that detect an obstacle, e.g., a preceding vehicle, positioned around the host vehicle and measure a distance with the obstacle and/or a relative speed thereof.

The sensing device 120 may include a plurality of sensors to detect an external object of the vehicle, to obtain information related to a position of the external object, a speed of the external object, a moving direction of the external object, and/or a type of the external object (e.g., vehicles, pedestrians, bicycles or motorcycles, etc.). To the present end, the sensing device 120 may include an ultrasonic sensor, a radar, a camera, a laser scanner, and/or a corner radar, a Light Detection and Ranging (LiDAR), an acceleration sensor, a yaw rate sensor, a torque measurement sensor and/or a wheel speed sensor, a steering angle sensor, etc.

Figure 2A:
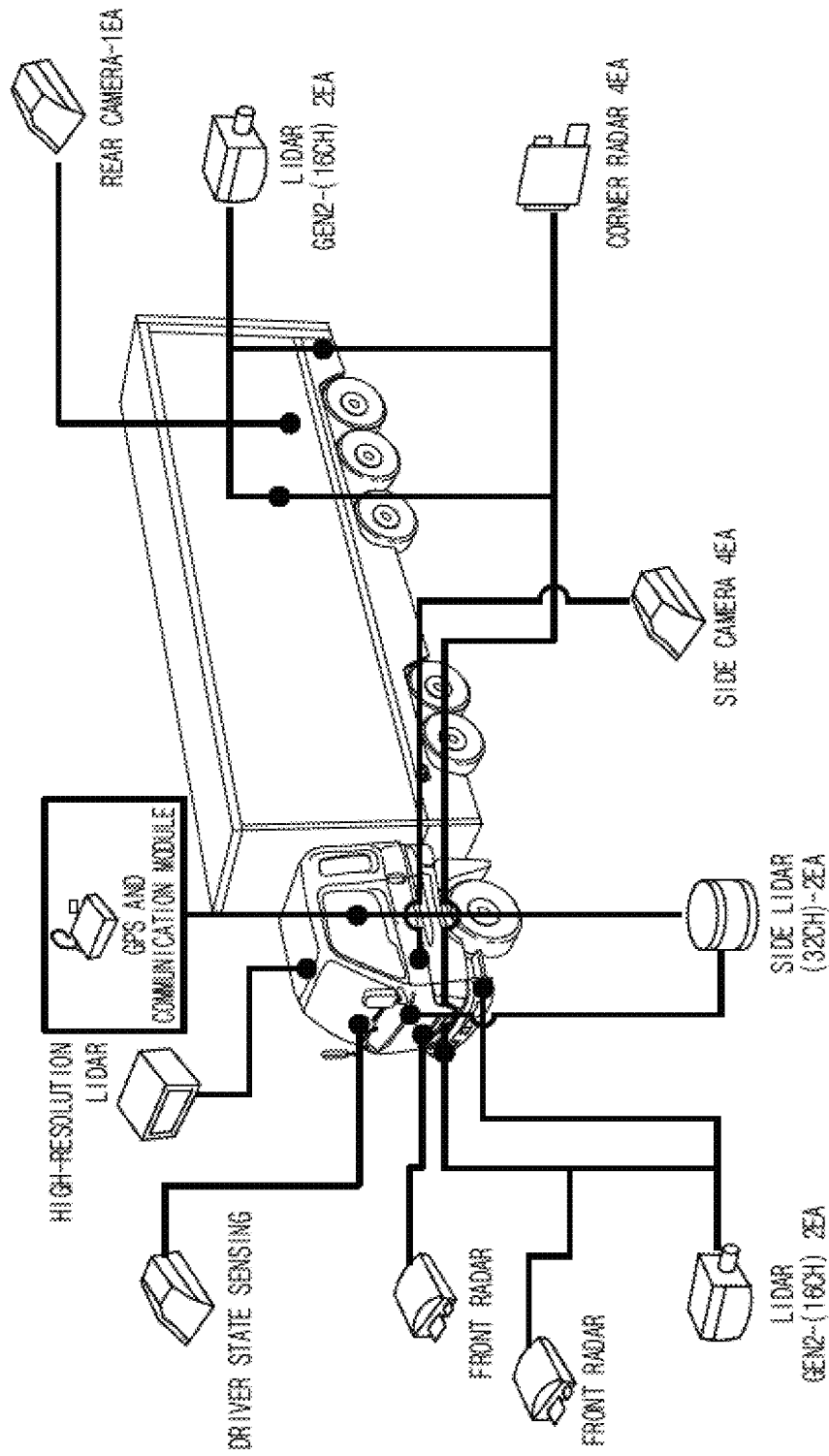
FIG. 2A illustrates a view for describing a sensing device of an autonomous vehicle according to various exemplary embodiments of the present invention.
Figure 2B:
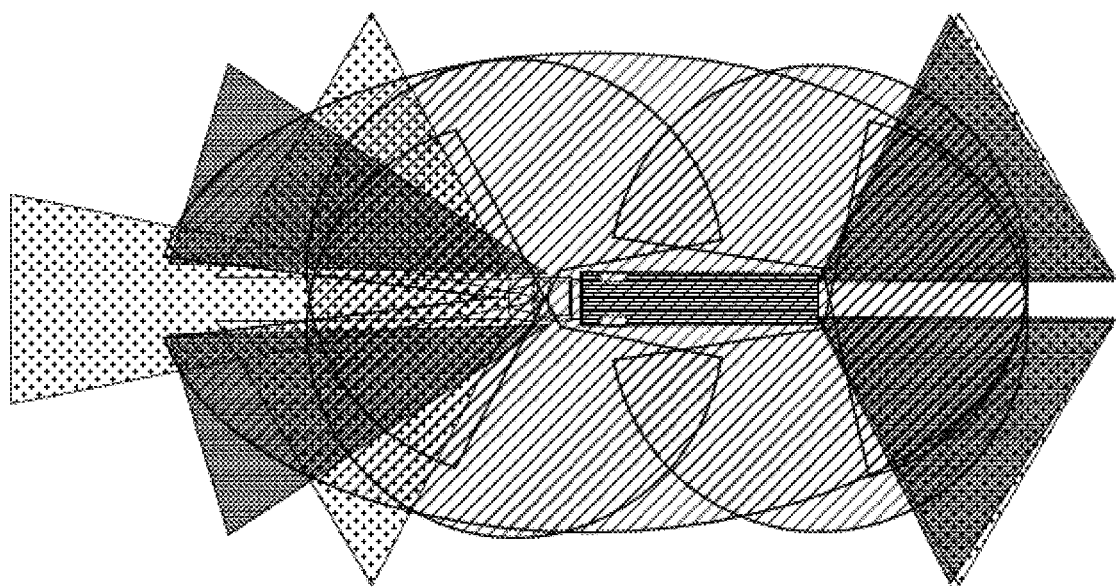
FIG. 2B illustrates a sensing range of a sensing device of an autonomous vehicle according to various exemplary embodiments of the present invention.

FIG. 2A illustrates a view for describing a sensing device of an autonomous vehicle according to various exemplary embodiments of the present invention, and FIG. 2B illustrates a sensing range of a sensing device of an autonomous vehicle according to various exemplary embodiments of the present invention.

Referring to FIG. 2A, the sensing device 120 may include a front radar mounted on the front of the vehicle, a Light Detection and Ranging (LiDAR), a side LiDAR, a side camera, a corner radar, a high-resolution LiDAR, a rear camera, a rear LiDAR, etc. Furthermore, referring to FIG. 2B, a surrounding situation may be detected through radars, cameras, and LiDARs of the front, rear, and side of the vehicle.

The steering control device 130 may be configured to control a steering angle of a vehicle, and may include a steering wheel, an actuator interlocked with the steering wheel, and a controller configured for controlling the actuator.

The braking control device 140 may be configured to control braking of the vehicle, and may include a controller that is configured to control a brake thereof.

The engine control unit (ECU) 150 may be configured to control engine driving of a vehicle, and may include a controller that is configured to control a speed of the vehicle.

When receiving information related to a misrecognized obstacle from the autonomous vehicle 100, the control system 200 displays the misrecognized obstacle on a driving path of the autonomous vehicle 100, may delete the misrecognized obstacles on the driving path of the autonomous vehicle 100 by receiving approval from an operator, and may transmit the driving path of the autonomous vehicle 100 in which the misrecognized obstacle is deleted to the autonomous vehicle 100.

The control system 200 may include a communication device 211, a storage 212, an interface device 213, and a processor 214.

The communication device 211 is a hardware device implemented with various electronic circuits to transmit and receive signals through a wireless or wired connection, and may transmit and receive information based on in-vehicle devices and in-vehicle network communication techniques.

As an example, the in-vehicle network communication techniques may include controller area network (CAN) communication, Local Interconnect Network (LIN) communication, flex-ray communication, Ethernet communication, and the like.

Furthermore, the communication device 211 may perform communication by use of a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, Worldwide Interoperability for Microwave Access (WiMAX), etc. Furthermore, short-range communication technique may include Bluetooth, ZigBee, ultra wideband (UWB), radio frequency identification (RFID), infrared data association (IrDA), and the like. For example, the communication device 211 may perform wireless communication with the vehicle 100, may receive a remote control request from the vehicle 100, and may transmit an approval request for the remote control path and a remote control command.

The storage 212 may store information received from the vehicle 100, and data and/or algorithm required for the processor 214 to operate, and the like.

As an example, the storage 212 may store a vehicle path received from the vehicle 100, image data photographed through a camera, a remote control path, a remote control command selected by an operator, and the like.

The storage 212 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 213 may include an input means configured for receiving a control command from an operator and an output means for outputting an operation state of the control system 200 and results thereof. Herein, the input means may include a key button, and may further include a mouse, a keyboard, a touch screen, a microphone, a joystick, a jog shuttle, a stylus pen, and the like. Furthermore, the input means may further include a soft key implemented on the display. For example, the interface device 213 may display map information in which a driving path of the vehicle, a current position of the vehicle, information related to surrounding objects, etc. are marked based on vehicle data received from the vehicle 100. For example, the interface device may include all communication terminals such as a personal computer (PC), a notebook computer, a smartphone, a tablet PC, a pad, a personal digital assistant (PDA), and a wearable device.

The output means may include a display, and may further include a voice output means such as a speaker. In the instant case, when a touch sensor formed of a touch film, a touch sheet, or a touch pad is provided on the display, the display may operate as a touch screen, and may be implemented in a form in which an input device and an output device are integrated.

In the instant case, the display may include at least one of a liquid crystal display (LCD), a thin film transistor liquid crystal display (TFT LCD), an organic light emitting diode display (OLED display), a flexible display, a field emission display (FED), or a 3D display.

The processor 214 may be electrically connected to the communication device 211, the storage 212, the interface device 213, and the like, may electrically control each component, and may be an electrical circuit that executes software commands, performing various data processing and determinations described below.

The processor 214 may process a signal transferred between components of the control system 200, and may perform overall control such that each of the components can perform its function normally. The processor 214 may be implemented in a form of hardware, software, or a combination of hardware and software, or may be implemented as microprocessor.

When receiving information related to a misrecognized obstacle from the autonomous vehicle, the processor 214 displays the misrecognized obstacle on a driving path of the autonomous vehicle, deletes the misrecognized obstacle on the driving path of the autonomous vehicle by receiving approval from an operator, and transmits the driving path of the autonomous vehicle in which the misrecognized obstacle is deleted to the autonomous vehicle.

When receiving the remote control request from the autonomous vehicle 100, the processor 214 may generate the remote control path based on the information received from the autonomous vehicle 100.

When receiving no approval for the remote control path from the autonomous vehicle 100, the processor 214 may generate the remote control path for avoiding the misrecognized obstacle again.

Figure 3:
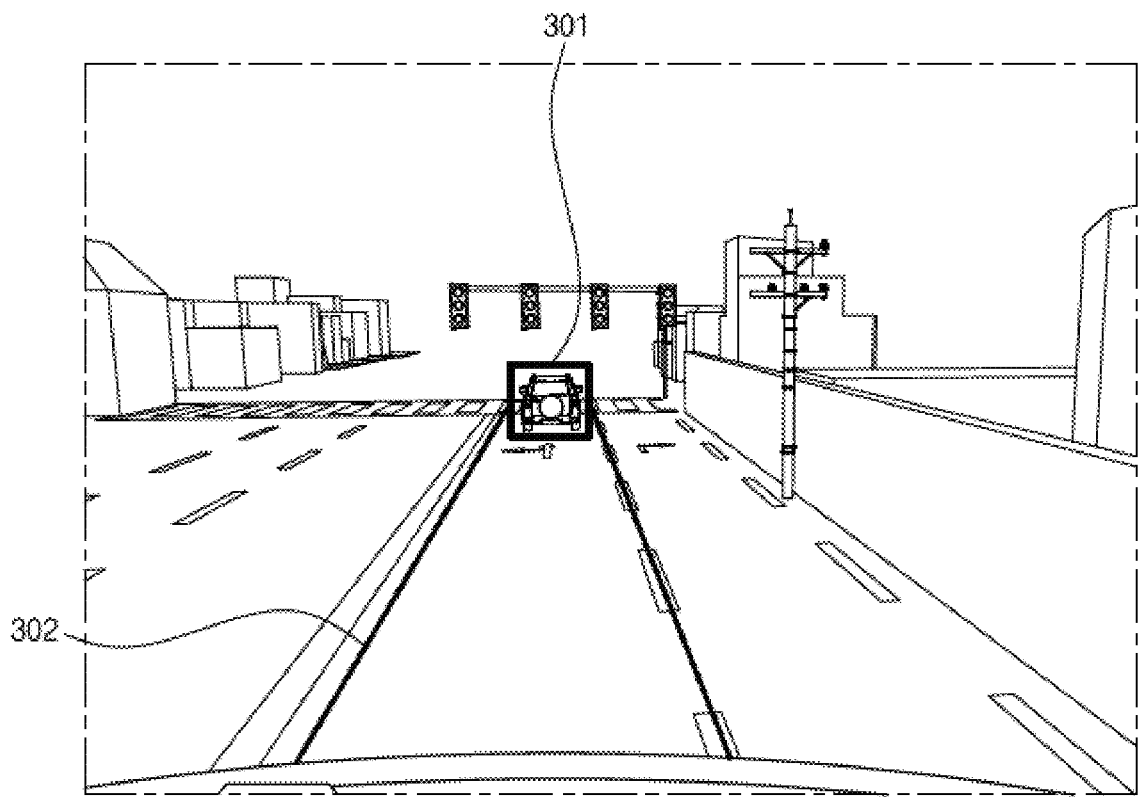
FIG. 3 illustrates an example of a screen displaying an obstacle in augmented reality in a normal driving mode in an autonomous vehicle according to various exemplary embodiments of the present invention.

FIG. 3 illustrates an example of a screen displaying an obstacle based on augmented reality in a normal driving mode in an autonomous vehicle according to various exemplary embodiments of the present invention.

Referring to FIG. 3, the target 301 may be box-processed and displayed to maintain a distance between vehicles in front in a normal driving situation, and a driving path 302 may be displayed in the augmented reality.

Figure 4:
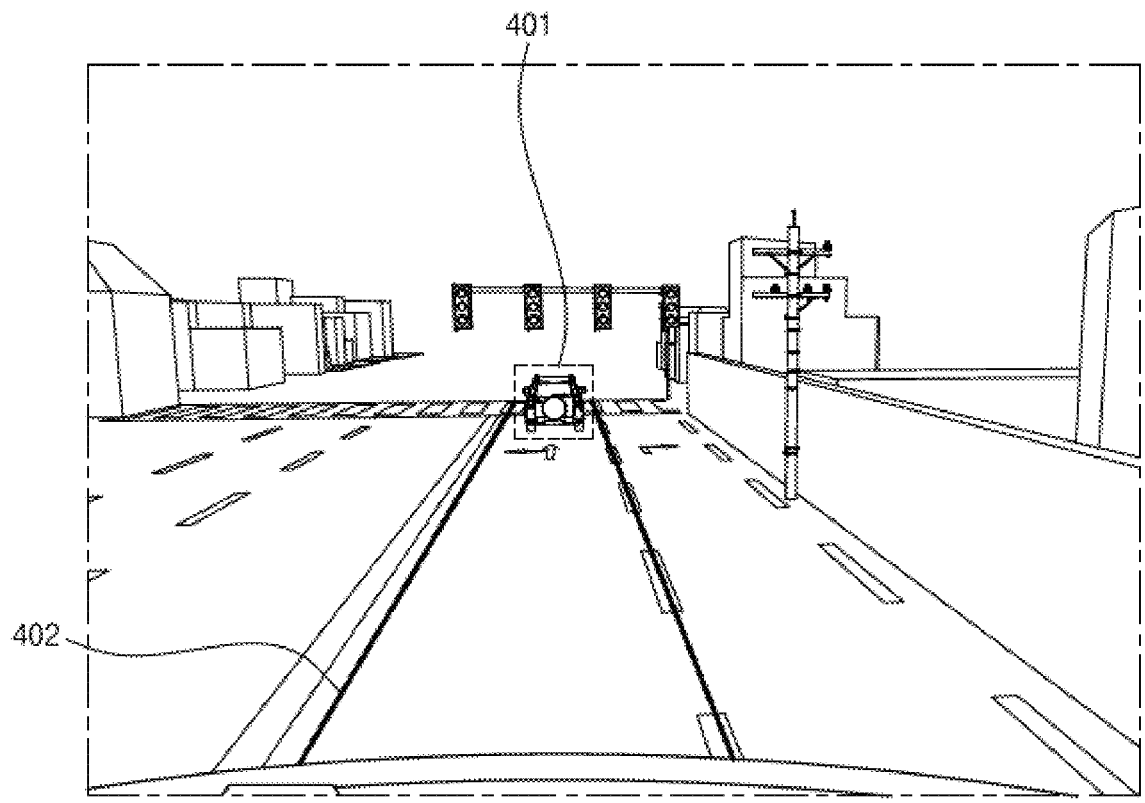
FIG. 4 illustrates an example of a screen displaying an obstacle in augmented reality in a stop control mode in an autonomous vehicle according to various exemplary embodiments of the present invention.

FIG. 4 illustrates an example of a screen displaying an obstacle based on augmented reality in a stop control mode in an autonomous vehicle according to various exemplary embodiments of the present invention.

Referring to FIG. 4, during the stop control mode, i.e., when stopping is required to maintain the distance between vehicles in front, a target 401, which is a reason for the stopping, is box-processed to be displayed, and a line color and thickness of the box of the target 301 during the normal driving mode of FIG. 3 are differently displayed so that the normal driving mode and the stop control mode may be distinguished. In the instant case, the line color and thickness of the driving path 402 may be distinguished from those of the normal driving mode, but may be displayed in a same manner. FIG. 3 and FIG. 4 illustrate examples of box-processing the targets 301 and 401, but the present invention is not limited thereto, and edge portions of the targets 301 and 401 may be darkly displayed, or may be displayed through rounding processing such as a circle.

Figure 5:
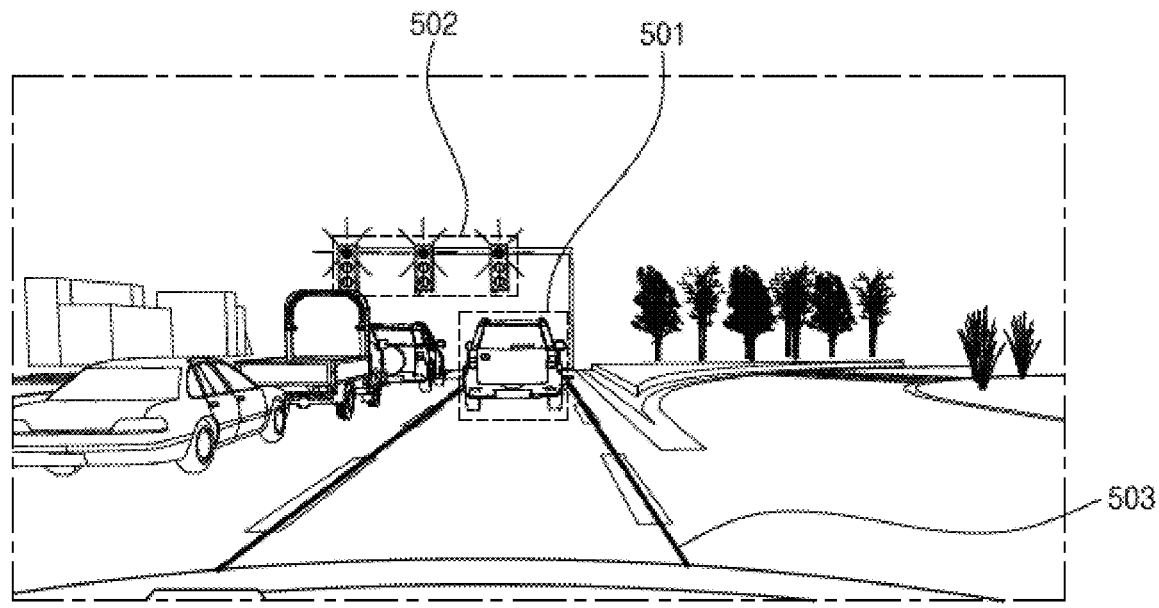
FIG. 5 illustrates an example of a screen displaying an obstacle including traffic light information in augmented reality in a stop control mode in an autonomous vehicle according to various exemplary embodiments of the present invention.

FIG. 5 illustrates an example of a screen displaying an obstacle including traffic light information based on augmented reality in a stop control mode in an autonomous vehicle according to various exemplary embodiments of the present invention.

Referring to FIG. 5, during the stop control mode, not only a front target 501 for maintaining a distance between vehicles in front but also a front traffic light 502 may be displayed together to indicate that the vehicle is stopped by the traffic light 502. Similarly, the line color and thickness of the driving path 503 may be distinguished from those of the normal driving mode, but may be displayed in a same manner.

Figure 6:
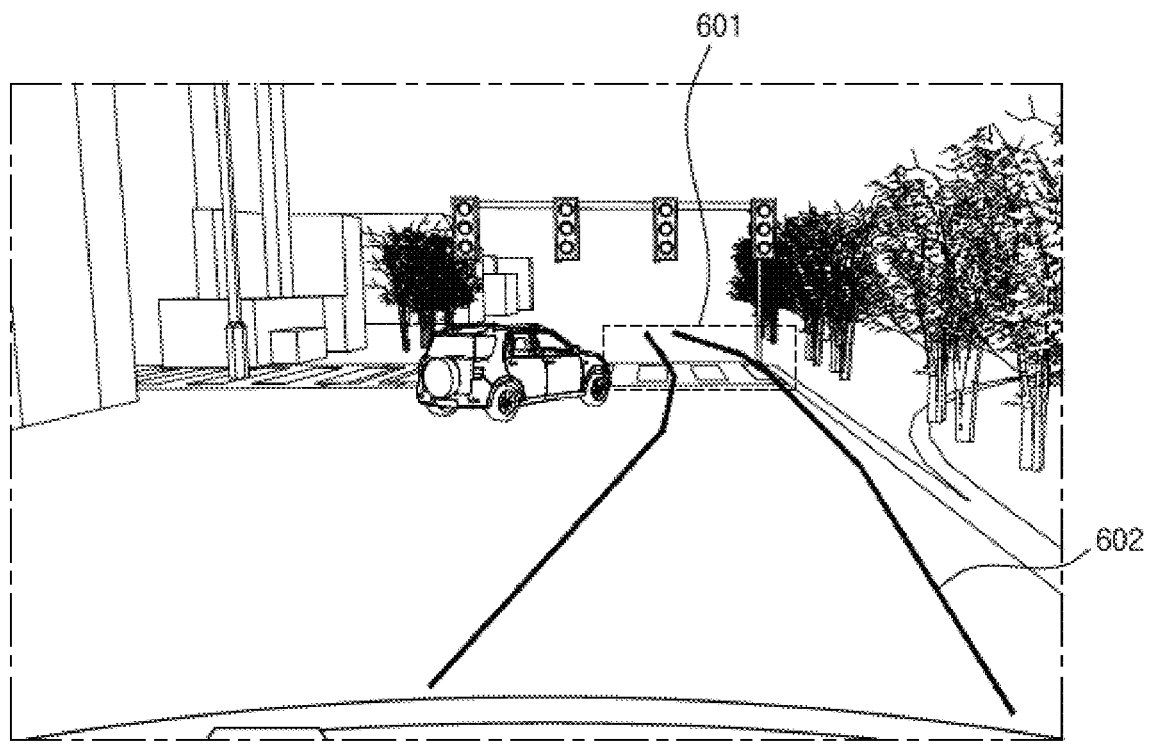
FIG. 6 illustrates an example of a screen displaying an obstacle including traffic light information which displays a misrecognized target in augmented reality in a misrecognition mode in an autonomous vehicle according to various exemplary embodiments of the present invention.

FIG. 6 illustrates an example of a screen displaying an obstacle including traffic light information which displays a misrecognized target based on augmented reality in a misrecognition mode in an autonomous vehicle according to various exemplary embodiments of the present invention.

Referring to FIG. 6, a front misrecognized target 601 may displayed through box processing, and the line color and thickness of the box of the misrecognized target 601 may be distinguished from those of the normal driving mode. Similarly, the line color and thickness of the driving path 602 may be distinguished from those of the normal driving mode, but may be displayed in a same manner.

Figure 7:
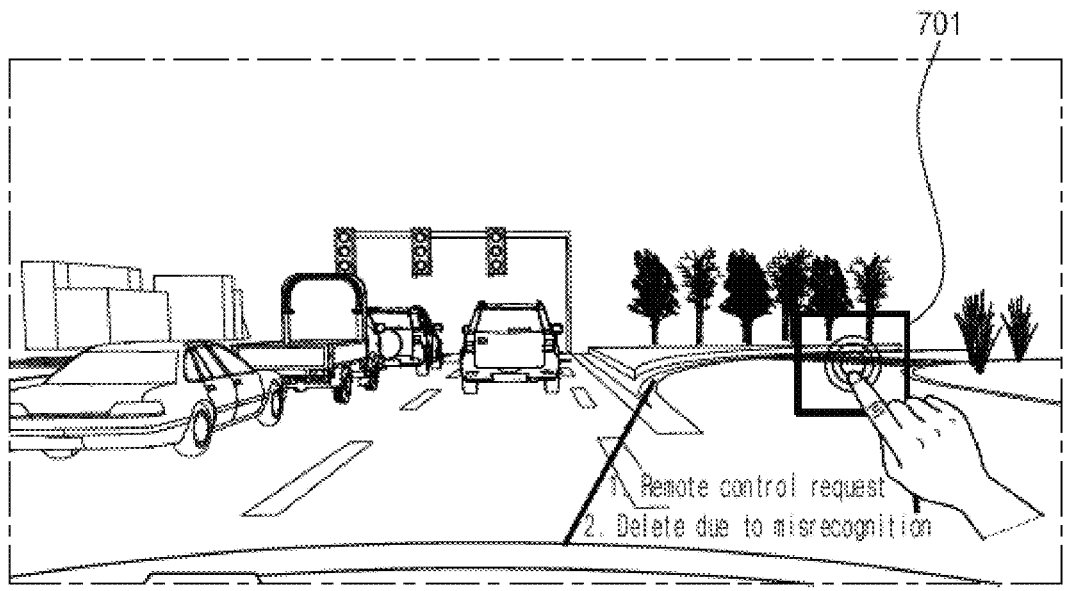
FIG. 7 and FIG. 8 illustrate examples of a screen for deleting a misrecognized obstacle depending on a driver request according to various exemplary embodiments of the present invention.
Figure 8:
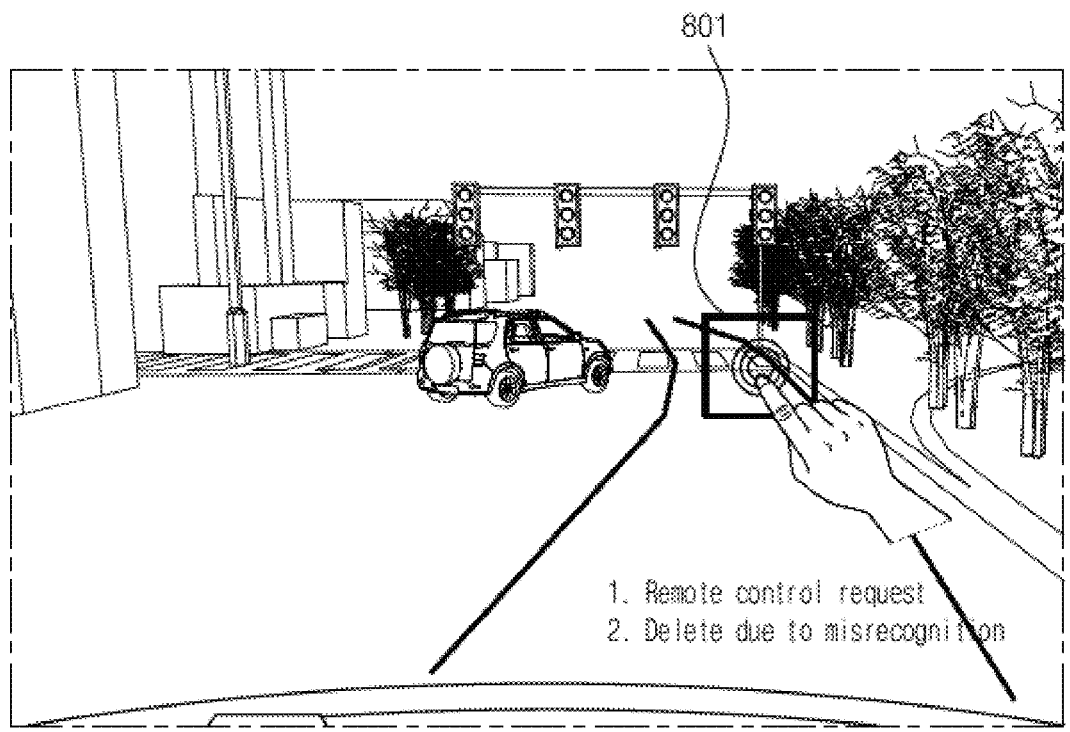

FIG. 7 and FIG. 8 illustrate examples of a screen for deleting a misrecognized obstacle depending on a driver request according to various exemplary embodiments of the present invention.

Referring to FIG. 7 and FIG. 8, a driver may delete misrecognized obstacles 701 and 801 by directly double-touching them, or may select the misrecognized obstacles 701 and 801 to request remote control to the control system 200. When the driver selects the misrecognized obstacles 701 and 801 to request the remote control to the control system 200, information related to the misrecognized obstacles may be transmitted to the control system 200. In the instant case, the information related to the misrecognized obstacles may include a current driving path, positions of the misrecognized obstacles, types and sizes thereof, and the like. The display device of the vehicle 100 may be implemented based on a touch screen to select the misrecognized obstacles 701 and 801.

Figure 9:
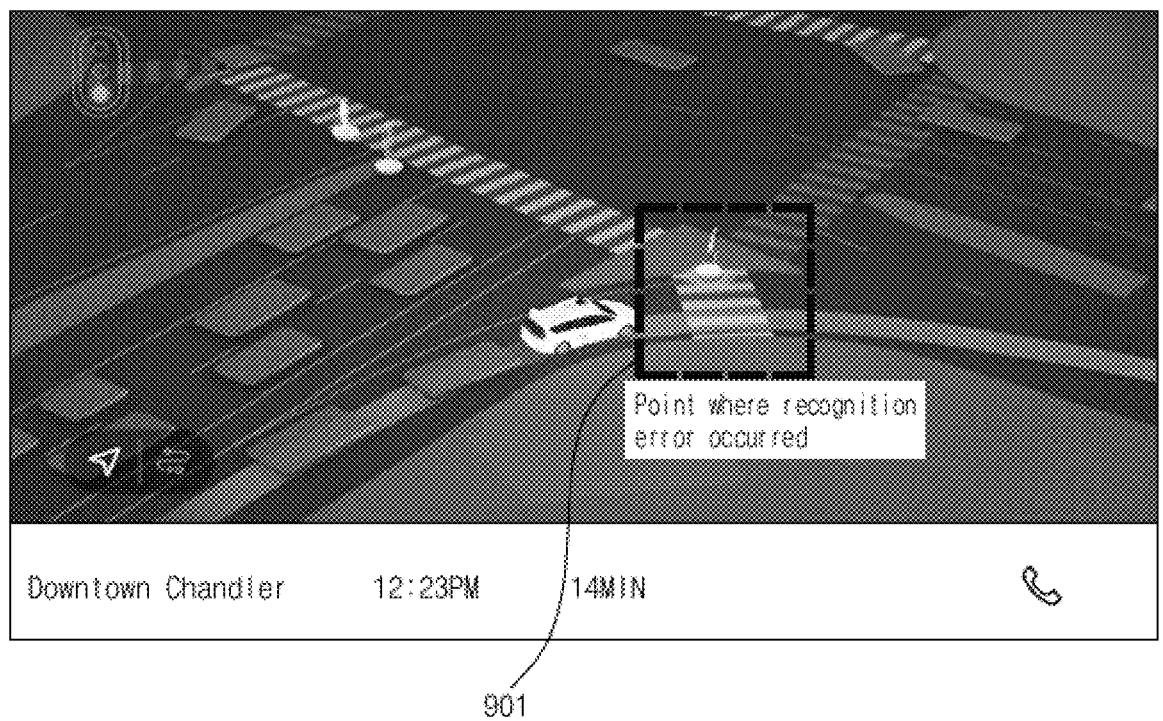
FIG. 9 illustrates an example of a screen on which a misrecognized obstacle is displayed depending on a driver request in a control system according to various exemplary embodiments of the present invention.

FIG. 9 illustrates an example of a screen on which a misrecognized obstacle is displayed depending on a driver request in a control system according to various exemplary embodiments of the present invention.

When receiving information related to a misrecognized obstacle from vehicle 100, the control system 200 enables an operator to grasp a situation at a glance by constructing and displaying a 3D screen based on a current driving path, a position of the misrecognized obstacle, a type and a size thereof, etc. In FIG. 9, a point 901 where a recognition error occurred is illustrated.

Figure 10:
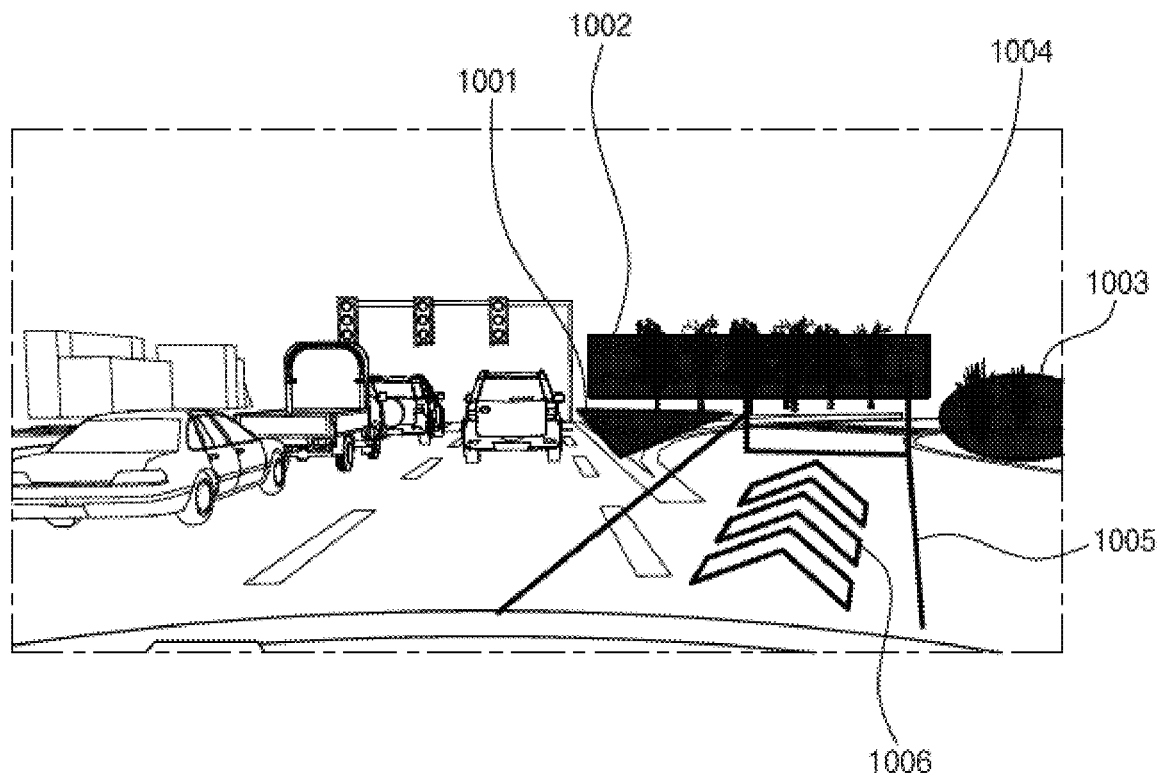
FIG. 10 illustrates an example of a screen displaying a change in a remote control path in augmented reality in an autonomous vehicle according to various exemplary embodiments of the present invention.

FIG. 10 illustrates an example of a screen displaying a change in a remote control path based on augmented reality in an autonomous vehicle according to various exemplary embodiments of the present invention.

Referring to FIG. 10, the vehicle 100 may receive a remote control path from the control system 200 to display it on a display device. In the instant case, areas (e.g., no roads) 1001, 1002, and 1003 where vehicle driving is impossible in the remote control path may be displayed, and when a misrecognized obstacle is deleted, a deleted state may be displayed by processing it with a box 1004. In the instant case, the areas (e.g., no roads) 1001, 1002, and 1003 where vehicle driving is impossible and the box 1004 in which the misrecognized obstacle is deleted may be displayed based on augmented reality such that a driver may intuitively check them in the driving path through separate colors, hatching, etc. The vehicle 100 displays the box 1004 in which the misrecognized obstacle is deleted in a blinking manner so that the driver can recognize at a glance that the misrecognized obstacle has been deleted. Furthermore, the areas 1001, 1002, and 1003 in which the vehicle driving is impossible may be marked or blocked.

Furthermore, the vehicle 100 may display a remote control path 1005 and additionally display an arrow 1006, and may blink or highlight the arrow 106 such that the driver can check at glance a portion which is modified from a driving path before finding a misrecognized obstacle to a remote control path which is generated to avoid the misrecognized obstacle.

Figure 11:
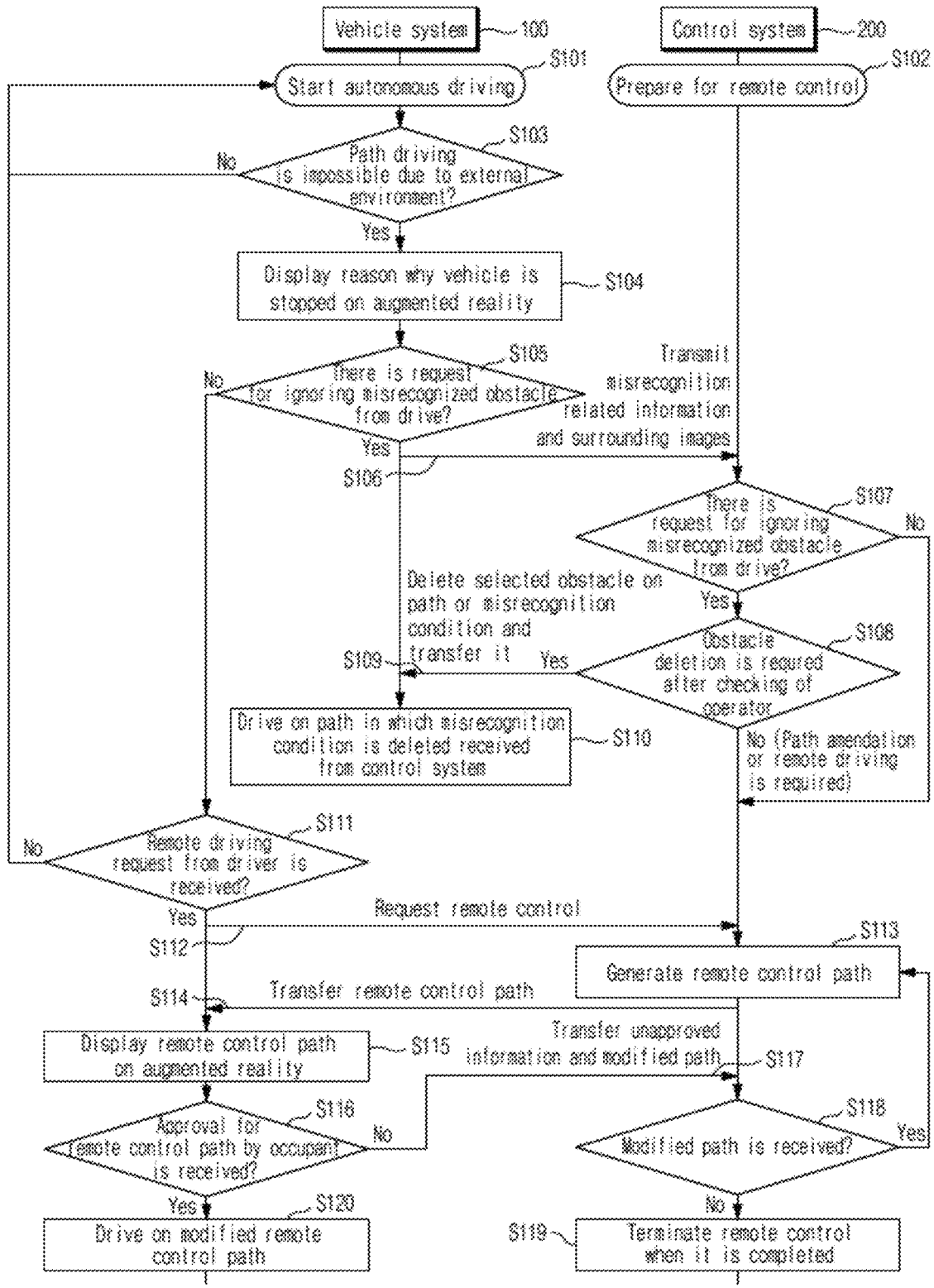
FIG. 11 illustrates a flowchart showing a remote control method for an autonomous vehicle according to various exemplary embodiments of the present invention.

Hereinafter, a remote control method for an autonomous vehicle according to various exemplary embodiments of the present invention will be described in detail with reference to FIG. 11. FIG. 11 illustrates a flowchart showing a remote control method for an autonomous vehicle according to various exemplary embodiments of the present invention.

Hereinafter, it is assumed that the autonomous driving control apparatus 110 of the vehicle 100 of FIG. 1 and the control system 200 perform processes of FIG. 11. Furthermore, in the description of FIG. 11, it may be understood that operations referred to as being performed by each system are controlled by a processor of each of the systems.

Referring to FIG. 11, the vehicle 100 starts autonomous driving (S101), and the control system 200 prepares for remote control (S102).

The vehicle 100 determines whether driving of a current path is impossible due to an external environment during autonomous driving (S103), and when the driving of the current path is impossible, displays a reason why the current route is impossible to drive, i.e., a reason the vehicle is stopped, on a display device based on the augmented reality (S104).

Next, the vehicle 100 checks whether there is a request for ignoring a misrecognized obstacle from a driver (S105), and when receiving a request for ignoring the misrecognized obstacle from the driver, the vehicle 100 transmits misrecognition related information and surrounding images to the control system 200 (S106). In the instant case, the misrecognition related information may include information such as a current driving path, a position and size of an obstacle which is misrecognized on the current driving path, position information of the host vehicle, etc.

Accordingly, the control system 200 checks whether a request of the driver to ignore the misrecognized obstacle is received from the vehicle 100 (S107), and when the request to ignore the misrecognized obstacle is not received, waits to receive a remote control request from the vehicle 100.

On the other hand, when receiving no request for ignoring the misrecognized obstacle from the vehicle 100, the control system 200 displays the information related to the misrecognized obstacle received from the vehicle 100 such that an operator can see it (see FIG. 9), and when receiving a request for deleting the misrecognized obstacle from the operator after the operator checks the misrecognition related information (S108), deletes the misrecognized obstacle on the current driving path and transmits the path to the vehicle 100 (S109).

On the other hand, when receiving no request for deleting the misrecognized obstacle (condition) from the operator, the control system 200 determines that the current driving path is modified or remote control is required, and waits to receive a remote control request from the vehicle 100.

On the other hand, when receiving a path in which the misrecognized obstacle is deleted from the control system 200, the vehicle 100 follows and controls the path in which the misrecognized obstacle is deleted (S110).

In step S105, when receiving no request for ignoring the misrecognized obstacle, that is, when the driver does not ignore the misrecognized obstacle and wants to recognize it as a real obstacle, the vehicle 100 determines whether there is a remote control request for avoiding the obstacle from the driver (S111).

When a remote control request is inputted from the driver, the vehicle 100 requests remote control to the control system 200 (S112). In the instant case, the vehicle 100 transmits information such as vehicle position information (coordinates), vehicle surrounding information (surrounding object information the current changing the color of the etc.), and map information (current path of the vehicle) together therewith when requesting the remote control.

The control system 200 generates a remote control path based on the information received from the vehicle 100 when receiving the remote control request (S113), and transmits the generated remote control path to the vehicle 100 (S114).

Accordingly, the vehicle 100 displays the remote control path received from the control system 200 on a display device based on augmented reality (S115), and receives approval of the displayed remote control path from the driver or an occupant.

The vehicle 100 checks whether the displayed remote control path is approved by the driver or the occupant (S116), and when the approval is completed, the vehicle 100 follows and controls a modified remote control path received from the control system 200 (S120).

On the other hand, when the displayed remote control path is not approved by the driver or occupant, the vehicle 100 transmits unapproved information and the modified path to the control system 200 (S117).

Accordingly, the control system 200 checks whether the modified path is received from the vehicle 100 (S118), and when the modified path is received, returns to the above-described step S113 to re-generate the remote control path.

On the other hand, the control system 200 determines that the vehicle 100 is being remotely controlled to the corresponding path when the modified path is not received, and terminates the remote control when it is completed S119). In the instant case, when the remote control is completed, the vehicle 100 transmits the remote control path to the control system 200.

As described above, according to various exemplary embodiments of the present invention, when an obstacle recognized by the vehicle 100 through the sensing device 120 is misrecognized, the misrecognized obstacle may be deleted depending on a request of the driver, or remote control may be performed to delete the misrecognized obstacle. Accordingly, the driver of the vehicle 100 may easily correct errors that occur during autonomous driving, securing reliability of the remote control, improving commercialization of autonomous driving.

Furthermore, according to various exemplary embodiments of the present invention, when the remote control path is changed due to a misrecognized obstacle, the changed remote control path may be displayed based on augmented reality to enable the driver to intuitively recognize it.

Figure 12:
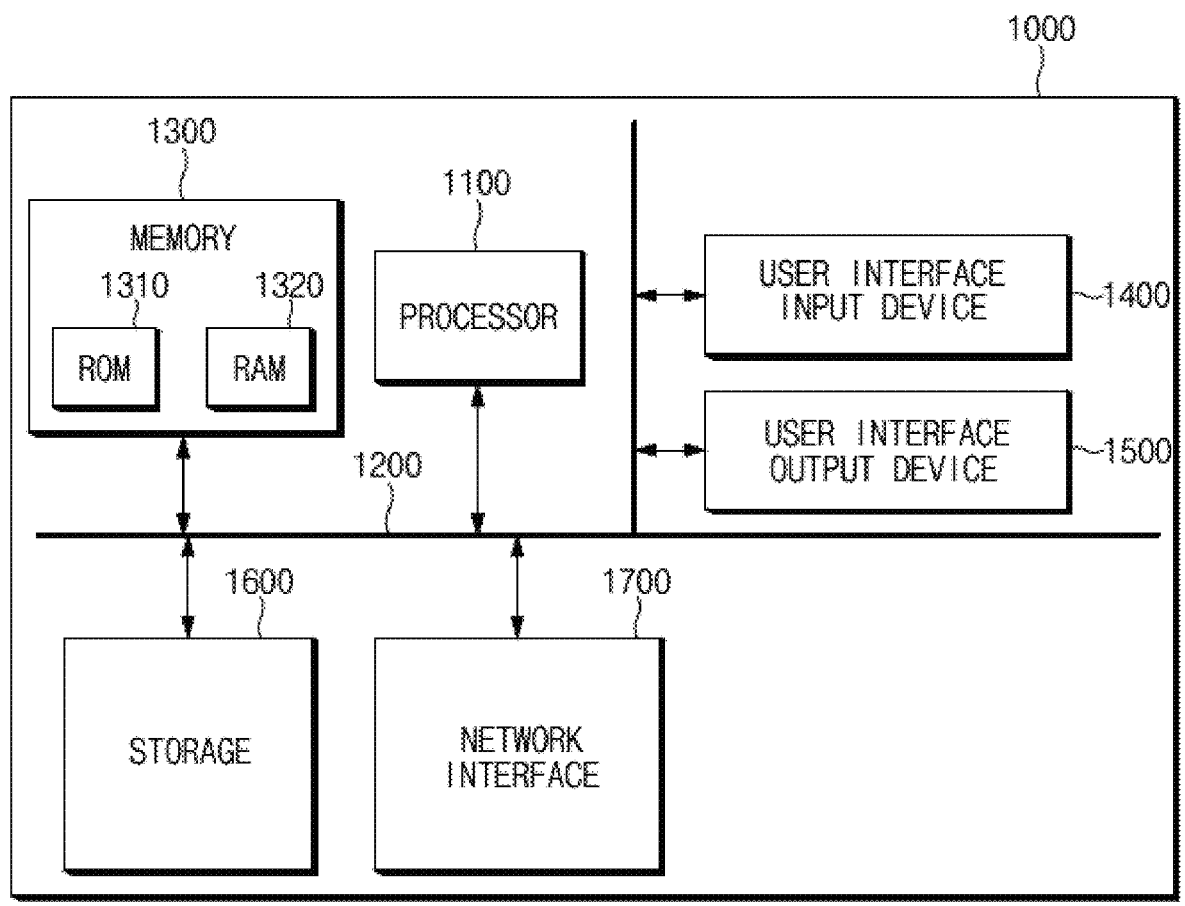
FIG. 12 illustrates a computing system according to various exemplary embodiments of the present invention.

FIG. 12 illustrates a computing system according to various exemplary embodiments of the present invention.

Referring to FIG. 12, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which various exemplary embodiments of the present invention pertains may make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An autonomous vehicle comprising:
   a display device configured to display a driving path of the autonomous vehicle; and
   an autonomous driving control apparatus including a processor that is configured to:
   display a situation in which driving of the driving path is impossible on the display device in augmented reality when the situation in which the driving of the driving path is impossible occurs due to an external environment during autonomous driving of the autonomous vehicle,
   transmit information related to a misrecognized obstacle to a control system when receiving a request for deleting the misrecognized obstacle, and
   receive a driving path in which the misrecognized obstacle is deleted from the control system and control and follow the received driving path,
   wherein the processor is configured to:
   display an area in which the misrecognized obstacle is deleted in the driving path;
   request approval for a received remote control path to a driver or an occupant when receiving the remote control path for requesting of remote control from the control system; and
   transmit unapproved information and an unapproved remote control path to the control system when the approval for the remote control path by the driver or the occupant is not completed.

2. The autonomous vehicle of claim 1, further including:
   a sensing device configured to detect the situation in which the driving of the driving path is impossible.

3. The autonomous vehicle of claim 1, wherein the processor is configured to display the driving path received from the control system, in which the misrecognized obstacle is deleted, on the display device in the augmented reality.

4. The autonomous vehicle of claim 3, wherein the processor is configured to control the area to blink for a predetermined time period.

5. The autonomous vehicle of claim 3, wherein the processor is configured to mark or block an area in which a vehicle is unable to be driven in the driving path.

6. The autonomous vehicle of claim 1, wherein when the driving path is displayed on the display device in the augmented reality, the processor is configured to:
   display an area of a front target for maintaining an in-vehicle distance with a vehicle in front of the autonomous vehicle, and
   distinguish and display a line thickness or a line color indicating the area of the front target during a normal driving mode and a stop control mode of the autonomous vehicle.

7. The autonomous vehicle of claim 6, wherein the processor is configured to display a front signal condition during the stop control mode.

8. The autonomous vehicle of claim 1, wherein the processor is configured to:
   display an area of the misrecognized obstacle in the driving path, and
   display a line color or line thickness indicating the area of the misrecognized obstacle in a normal driving mode separately from a stop control mode of the autonomous vehicle.

9. The autonomous vehicle of claim 1, wherein the processor is configured to transmit the information related to the misrecognized obstacle to the control system in response to the request for deleting the misrecognized obstacle from the driver.

10. The autonomous vehicle of claim 1, wherein when receiving no request for deleting the misrecognized obstacle from the driver, the processor is configured to request the remote control of the autonomous vehicle to the control system.

11. The autonomous vehicle of claim 10, wherein when receiving a remote control path for the requesting of the remote control from the control system, the processor is configured to display the remote control path in the augmented reality.

12. The autonomous vehicle of claim 11, wherein the processor is configured to display a screen for obtaining approval for the remote control path by the driver or the occupant on the display device.

13. The autonomous vehicle of claim 12, wherein the processor is configured to follow and control the remote control path when the approval for the remote control path by the driver or the occupant is completed.

14. The autonomous vehicle of claim 1, wherein the autonomous driving control apparatus includes:
- a communication device configured to communicate with the control system; and
- a storage configured to store the remote control path received from the control system.

15. A control system comprising:
- a processor configured to display a misrecognized obstacle on a driving path of an autonomous vehicle when receiving information related to the misrecognized obstacle from the autonomous vehicle, to delete the misrecognized obstacle on the driving path of the autonomous vehicle by receiving approval from an operator, and to transmit a driving path of the autonomous vehicle in which the misrecognized obstacle is deleted to the autonomous vehicle,
- wherein the processor is configured to re-generate a remote control path for avoiding the misrecognized obstacle when an approval for the remote control path is not received from the autonomous vehicle.

16. The control system of claim 15, wherein the processor is configured to generate the remote control path to provide the generated remote control path to the autonomous vehicle when receiving a request for remote control of the autonomous vehicle for avoiding the misrecognized obstacle from the autonomous vehicle.

17. A remote control method for an autonomous vehicle, the remote control method comprising:
- displaying, by an autonomous driving control apparatus, a situation in which driving of a driving path is impossible on a display device in augmented reality when the situation in which the driving of the driving path is impossible occurs due to an external environment during autonomous driving of the autonomous vehicle;
- receiving, by the autonomous driving control apparatus, a request for deleting a misrecognized obstacle from a driver;
- transmitting, by the autonomous driving control apparatus, information related to the misrecognized obstacle to a control system;
- displaying an area in which the misrecognized obstacle is deleted in the driving path;
- following and controlling, by the autonomous driving control apparatus, a driving path in which the misrecognized obstacle is deleted by receiving the driving path from the control system;
- requesting approval for a received remote control path to the driver or an occupant when receiving the remote control path for requesting of remote control from the control system; and
- transmitting unapproved information and an unapproved remote control path to the control system when the approval for the remote control path by the driver or the occupant is not completed.

18. The remote control method of claim 17, further including:
- displaying, by the autonomous driving control apparatus, the driving path in which the misrecognized obstacle is deleted,
- wherein the displaying includes displaying an area in which the misrecognized obstacle is deleted, and controlling the area to blink for a predetermined time period.

* * * * *